F. Bramer.
Clutch Attachment for Harvesters.
No. 118,333.  Patented Aug. 22, 1871.
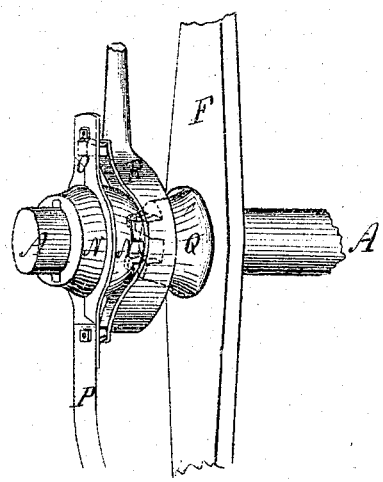
Witnesses:
A. Ruppert.
J. W. Mitten.
Inventor:
Frank Bramer
Per Ellsun Bnit
Attorneys.

UNITED STATES PATENT OFFICE.

FRANK BRAMER, OF LITTLE FALLS, NEW YORK.

IMPROVEMENT IN CLUTCHES FOR HARVESTERS.

Specification forming part of Letters Patent No. 118,333, dated August 22, 1871.

*To all whom it may concern:*

Be it known that I, FRANK BRAMER, of Little Falls, in the county of Herkimer and State of New York, have invented a new and useful Clutch Attachment for Harvesters; and I do hereby declare the following to be a full, clear, and exact description thereof, reference being had to the accompanying drawing forming a part of the same, and in which the figure represents a perspective view of the clutch and shifting attachment for sliding the former back and forth in throwing the same in and out of gear.

This invention has reference to an improved clutch attachment for harvesters, constituting an improvement upon the harvester for which Letters Patent were granted to me December 19, 1865; and it consists of a clutch, ring with a projection, shifting-arm having double inclined planes, and a hub, arranged substantially in the manner hereinafter shown and described.

To enable others to make and use my invention I will proceed to describe it.

F in the accompanying drawing refers to an arm or bar mounted upon the main axle A, and supplied with the sleeve or hub Q embracing the said axle, and having recesses which receive the projections upon the clutch N sliding upon the axle above referred to. The clutch N is embraced by and secured to a ring, O, to the upper end of which is secured one end of a spring, P, the opposite end of the said spring being fastened to the frame of the machine. The object of this spring is to hold the clutch N in gear with the sleeve or hub Q of the arm F while the gearing operating the cutter-bar shaft is in motion. Upon the inner side of the ring O are secured projections used for the purpose hereinafter described. R refers to the device for throwing in and out of gear the clutch N with the above-referred-to gearing, and it consists of a ring provided upon one side with a double-inclined plane, by means of which, when brought in contact with the projections upon the ring O by revolving the said device in the required direction, the said clutch is brought in contact with or removed from the sleeve or hub Q of the arm F. The said device R is supplied with a handle for operating it.

Having thus described my invention, what I claim, and desire to secure by Letters Patent, is—

The arrrangement, upon the axle A, of the clutch N, ring O with projections, as shown, shifting-arm R having double-inclined planes, and sleeve or hub Q, they being combined for joint operation, as shown and described.

FRANK BRAMER.

Witnesses:
    WATTS T. LOOMIS,
    A. LOOMIS.